Sept. 21, 1943.   M. HILQUIST   2,329,989
FILM HOLDER
Filed June 16, 1941   2 Sheets-Sheet 1
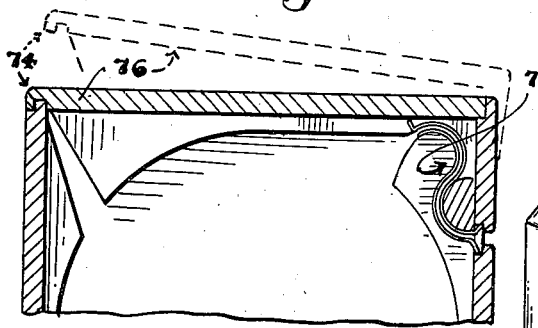
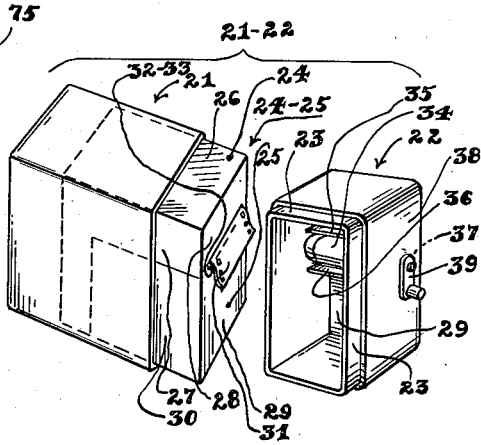
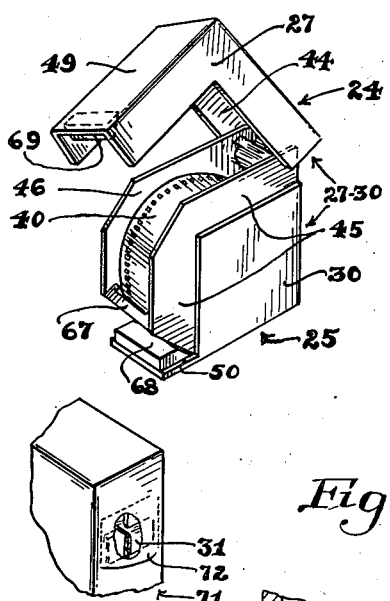
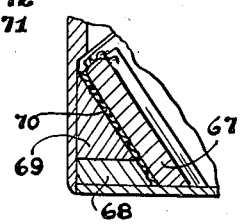
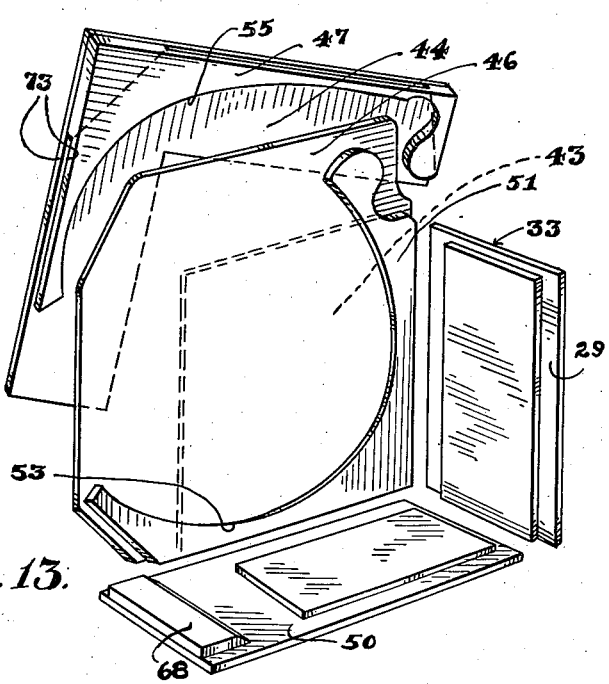
INVENTOR.
Milford Hilquist
BY Nicholas Rippen
REG. U.S. PATENT AGENT.

Sept. 21, 1943.    M. HILQUIST    2,329,989
FILM HOLDER
Filed June 16, 1941    2 Sheets-Sheet 2
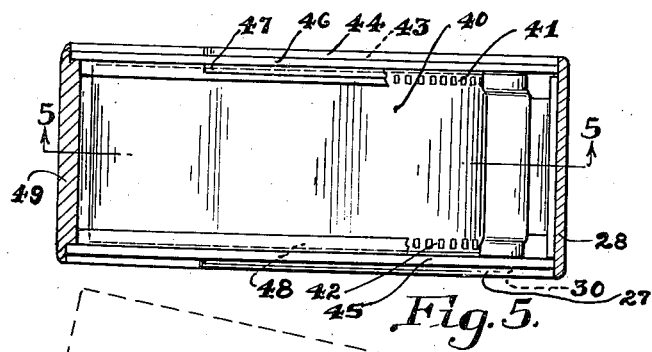
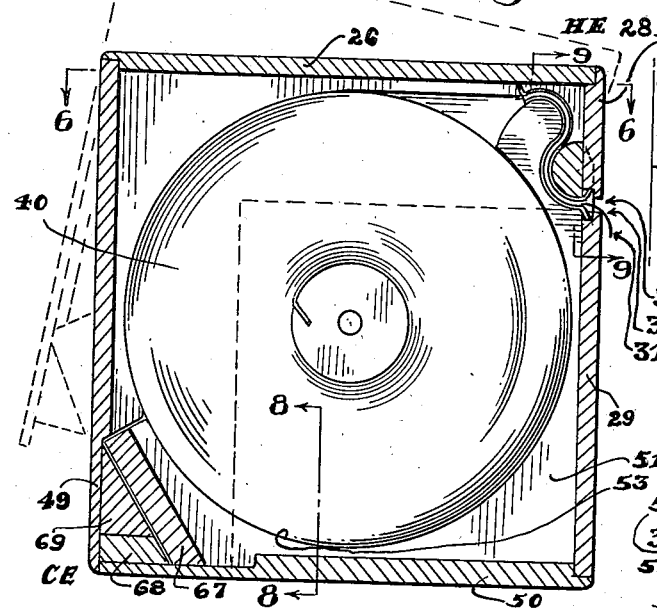
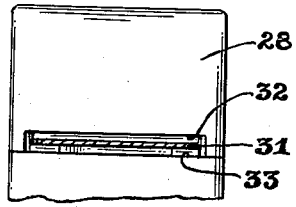
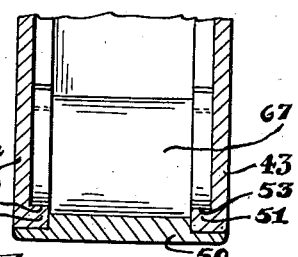
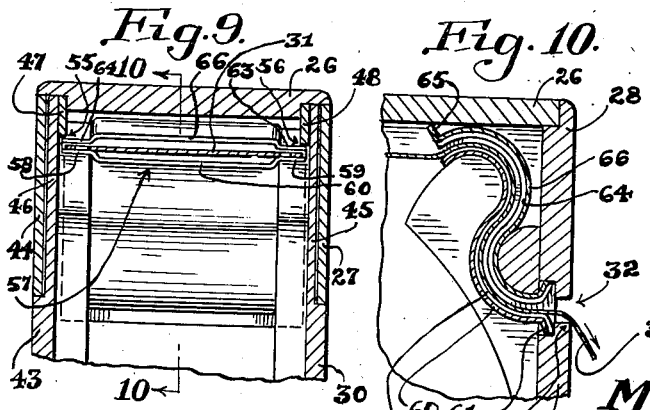
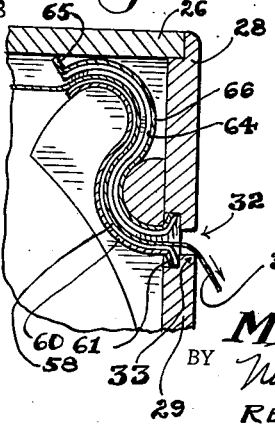
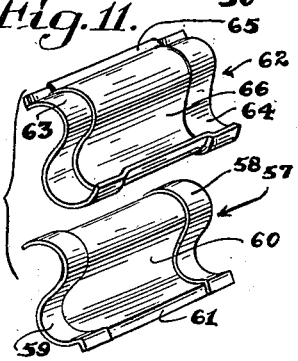
INVENTOR.
*Milford Hilquist*
BY
REG. U. S. PATENT AGENT.

Patented Sept. 21, 1943

2,329,989

UNITED STATES PATENT OFFICE 2,329,989

FILM HOLDER

Milford Hilquist, South Gate, Calif.

Application June 16, 1941, Serial No. 398,257

3 Claims. (Cl. 242—71)

My invention relates to devices for handling strips or ribbons of flexible, photographic film, coiled, wound, reeled or rolled, such as motion picture film or film for still photography.

More particularly, my invention relates to light-tight or daylight-loading devices for holding or storing rolled up, unexposed film strip of long lengths and feeding them out in short lengths, successively, for daylight-loading of a camera or of a cartridge containing a spool, intended for subsequent insertion in a camera, devices of the type mentioned being referred to also as chargers.

An object is to provide a means, for the use indicated, that is simple and inexpensive to make, use and maintain and that is proof against fogging, in the case of even the most sensitive film.

A further object is the provision of a minimum number of wasted "frames" of the film at the cutting and attaching position to each cartridge.

A further object is the utilization, in the film holder or immediate film-holding part of the device, of a roll of film that may be wound on a spindle-provided or non-spindle-provided reel or core or on an imperforate core or on a core that is not even axially recessed at the ends, whereby the greater part of the outermost coil of the roll is retained out of contact with any parts of the holder, the roll being substantially completely supported marginally, adjacently the two edges of the outermost coil.

Other objects of my invention will disclose themselves in the course of examining this specification and the accompanying drawings of two preferred embodiments, it being understood that they are merely illustrative and not limitative and that the scope of my invention is not to be defined by the above listed objects or by the features of the two embodiments herein below set forth but by the hereto appended claims, and that many other embodiments and variations and modifications of the herein selected embodiments will suggest themselves to persons skilled in the art.

Figure 1 is a perspective view of one device embodying my invention, showing the two sections of a container associated therewith, one of the sections, also referred to as parts, containing a holder.

Figure 2 is a fragmentary view in section of another device embodying my invention.

Figure 3 is a perspective view of the holder, part of which appears in Figure 1, shown with the mutually hingedly connected body and cover thereof in partly opened up state.

Figure 4 is a perspective view, exploded, of some of the parts constituting the holder.

Figure 5 is a sectional view of the holder, as seen in the plane 5—5 in Figure 6.

Figure 6 is a plan view of the holder in Figure 5, as seen in the plane 6—6 in Figure 5.

Figure 7 is a fragmentary view of the front, compound end wall or compound discharge wall of the holder, as seen from the direction of the arrow 7 in Figure 5.

Figure 8 is a sectional view, as seen in the plane 8—8 in Figure 5, assuming absence of the roll of film inside of the holder.

Figure 9 is a sectional view, as seen in the plane 9—9 in Figure 5.

Figure 10 is a sectional view, as seen in the plane 10—10 in Figure 9.

Figure 11 is a perspective, exploded view of the two principal parts constituting a certain, combined hinge-means and light-trap with slot, disposed adjacently the hinge-end of the holder.

Figure 12 is a fragmentary, perspective view of the container when wrapped, and showing a detachable tab-portion that temporarily seals the slot and retains the end of the film strip thereat.

Figure 13 is a fragmentary view in section of the closing end of the holder that is shown in Figures 1, 3, 4, 5 and the like.

The numeral 21—22 designates a two-part container, constituted of primary part 21 and of secondary part 22 having flanges or inner or false walls 23, whose outer surfaces, when the two parts have been brought into mutual, light-tight engagement, fit closely with the inner surfaces of the respectively adjacent walls of section 21, whereby outside light-rays, that would otherwise penetrate into the interior of the container, are confronted by three directions of travel, the adjacent directions therein being appreciably angularly disposed relatively to one another. The false walls may be part of part 21 instead of being part of part 22.

Contained by and partly within part 21 is holder 24—25, constituted of body member or body 25 and cover member or cover 24. The top wall, the side wall-section and the front wall-section of the cover are designated respectively by 26, 27 and 28. Side wall-section 27 is referred to herein also as an L-shaped wall-section and as an adjacent wall-section. Of the body, the side wall-section, also referred to herein as a rectangular wall-section or as a tongue-provided wall-section, and the front wall-section are designated respectively by 30 and 29. Wall-sections 27 and 30 together constitute what is herein referred to also as compound side wall 27—30. Wall-sections 28 and 29 together constitute what is herein referred to also as a discharge wall or compound discharge wall or compound end wall 28—29.

The numeral 31 designates (see Figure 1) the exteriorly disposed end of a roll of photographic film, contained within the holder 24—25, issuing therefrom through slot 32—33, constituted of lower edge 32 of wall-section 28 and upper edge 33 of wall-section 29.

Contained within secondary part 22 is a light-tight cartridge 34 (see Figure 1), retained against dislodgement by partitions 35 and 36. The cartridge contains a spool (not shown), whose axis is substantially aligned with aperture 37 in side wall-section 38 of part 22, said aperture accommodating winding handle 39, specifically the shank thereof, engaging the spool when the parts 21 and 22 have entered into mutual, light-tight engagement, with strip-end 31 having been previously secured to the spool, the handle 39 thereupon being actuated to wind a portion of the roll of film strip 40 onto the spool inside of the cartridge. After separating parts 21 and 22, the cartridge may be removed for insertion into a camera. The perforated, marginal portions of the film 40 are indicated by 41 and 42, see Figure 6.

Tongue-provided wall-section 43, corresponding to wall-section 30 and adjacent wall-section 44, corresponding to wall-section 27, can be seen in Figures 3, 4, 6 and 9. Rectangular or tongue-provided wall-sections 30 and 43 are respectively provided with tongues 45 and 46, extending marginally therefrom and lying in planes that are more inwardly disposed than the planes of the outer surfaces of wall-sections 30 and 43, see Figures 6 and 9. The cover 24 is provided with inner walls 47 and 48, respectively parallel with, adjacent to and spaced from wall-sections 44 and 27, and are adapted, together with said wall-sections, to snugly receive tongues 46 and 45, see Figures 4, 6 and 9, whereby outside light-rays, that would otherwise penetrate to strike the roll, are confronted by four directions of travel. The back end wall of the cover is indicated by 49. The bottom wall of the body is indicated by 50.

Respectively secured to the inside surfaces of tongues 46 and 45 are arcuated shoulder-walls 51 and 52, whose respective edges 53 and 54, together with edges 55 and 56, respectively of inner walls 47 and 48, constitute annular shoulders adapted, when the cover is in locked engagement with the body and the roll is contained therewithin, to engage and substantially completely support the roll marginally, adjacently both transversely opposed edges thereof corresponding to marginal parts 41 and 42 of the outermost coil of the roll, whereby greater part (the intermediate part) of the outermost coil, and successively of every other coil thereunder, is retained out of contact with any parts of the holder, see Figures 4, 5, 6, 8 and 9.

The view in Figure 5 is diagrammatic with respect to the there indicated concentric disposition of the roll relatively to the annular shoulders. In practice, the roll 40 would be lower than shown, and would be supported mainly by edges or shoulders 53 and 54, with perhaps the lower portions of edges or shoulders 55 and 56 engaging the roll in addition.

Intervening between tongues 46 and 45 and secured to the upper S-shaped portions of shoulder-walls 51 and 52 is S-shaped member 57, preferably of metal, provided with shoulders 58 and 59 adjacently the curved edges thereof, the major or intermediate portion thereof being indicated by 60, a flange thereof being indicated by 61, adapted to being recessed into upper edge 33, see Figures 5, 9, 10 and 11.

Substantially parallel with and spaced from member 57 is S-shaped member 62, secured to the cover adjacently edge 32 of wall-section 28 thereof, see Figures 5, 9, 10 and 11. Also preferably of metal and provided with shoulders 63 and 64, member 62 is provided with a flange 65, and its major or intermediate portion, corresponding to portion 60, is indicated by 66.

By referring to Figure 10 and particularly to Figure 9, it will be seen that only the marginal (perforated) portions of the film (Figure 6) are engaged by the S-shaped members, specifically by shoulders 63, 64, 58 and 59 thereof. It will be seen that the greater part of the film is retained out of contact with the S-shaped members, specifically out of contact with the major or intermediate portions of the members, 66 and 60. Thusly, that portion of the film that is to carry the photography is protected against scratching generated by parts of the holder. The only scratches to be feared are those that might be generated by hard particles embedded in the velvet-sheathed slot of the cartridge and of course by parts associated with subsequent handling of the film in the camera and in the developing room.

Secured to the bottom wall 50, see Figures 3, 4, 5 and 8, and spanning shoulder-walls 51 and 52, are members 67 and 68. Secured to the lower portion of back end wall 49 and extending across it transversely is member 69, which, with neighboring parts of and on wall 49, nest or interfit with members 67 and 68 and with the back edges of shoulder-walls 51 and 52 and of bottom wall 50 in a light-tight or light-excluding manner, mainly because light-rays, that would otherwise penetrate, are confronted, as can be seen, by four directions of travel. The surfaces of the said interfitting parts, as in the case of the surfaces in the hinge-means, may be black in color and matt in surfacing. Figure 13 shows the lining of the surface of one of the interfitting said members with a piece of velvet or the like, 70, for extra light-excluding effect.

In Figure 12, a detachable tab 72, which may be integral with the material constituting the wrapper 71, is shown broken away to disclose the terminal end 31 of the film strip, restrained by the thereto sealed tab from slipping back into the holder.

In Figure 4, the numeral 73 designates one of the spaces constituted by the wall-section and the shoulder-wall, in which space, as above described, the respective tongue is received.

Instead of the cover being L-shaped when viewed from laterally, with the closing end, indicated by CE, substantially obliquely disposed oppositely to the hinge-end, indicated by HE (see Figure 5), the holder may be adapted to have a cover that is not L-shaped. See Figure 2, in which modification four directions of travel are obtained by providing a more conventional type of cover with a tongue-and-groove construction at the back edge, 74, as well as at the side edges, which do not appear in the view. The numeral 75 indicates a hinge-means similar to that in the first described embodiment. The closing end of the cover is adjacent the same wall, namely 76, that the hinge-means 75 is closest to.

A tongue-and-groove construction may be substituted for the various types of light-excluding joints described in the first embodiment.

The holder need not of course be rectangular when viewed laterally or when viewed otherwise. The side walls may, per example, be pentagonal, hexagonal or the like. They may be trapezoidal, per example or they may be roughly rectangular or polygonal with one or more corners more or less rounded. These modifications may be introduced for esthetic reasons or for functional reasons involved in possible variations of the principles of my invention, as set forth herein and in the hereto annexed claims.

I claim:

1. A holder constituting part of a film-handling device for feeding out a roll of photographic film strip, said holder being adapted to retain therewithin said roll and constituted of a body member and a cover member that are adapted to enter into mutual, light-tight engagement and are hingedly connected by a quickly disjointable hinge-means, said hinge means being adapted to constitute a light-trap adapted to accommodate the passage therethrough of said strip, said hinge means being constituted of two mutually substantially parallel and spaced S-shaped members provided with corresponding shoulders along the curved edges thereof, said shoulders being disposed closer to one another than the remaining parts of said S-shaped members, said members being dimensioned, proportioned and related to one another in a manner to accommodate the passage therealong of said strip with the two, opposed, marginal parts thereof in contact with said shoulders and with the remaining intermediate part of said strip retained out of contact with any other parts of said S-shaped members.

2. A holder constituting part of a film-handling device for feeding out a roll of photographic film strip, said holder being adapted to retain therewithin said roll and constituted of a body member and a cover member that are adapted to enter into mutual, light-tight engagement and are hingedly connected by a quickly disjointable hinge means, said hinge means being adapted to constitute a light-trap adapted to accommodate the passage therethrough of said strip, said holder comprising: interiorly disposed annular shoulders adapted to engage and substantially completely support said roll marginally, adjacently both transversely opposed edges thereof, whereby the greater part of the outermost coil of said roll is retained out of contact with any parts of the holder; a compound discharge wall, from which said strip issues, constituted of an end wall of said body member and an end wall of said cover member; disposed angularly to said discharge wall, two compound side walls, each constituted of a substantially L-shaped wall-section that is part of said cover member and a substantially rectangular wall-section that is part of said body member; said rectangular wall-section being provided with a tongue that extends marginally therefrom and lies in a more inwardly disposed plane than that of the outer surface of said rectangular wall-section; said cover member being provided with an inner wall parallel with, adjacent to and spaced from said L-shaped wall-section, said inner wall and said L-shaped wall-section being adapted to snugly receive said tongue in a manner whereby outside light-rays, that would otherwise penetrate, are confronted by at least four directions of travel; said inner wall at least contributively providing said shoulders.

3. A holder constituting part of a film-handling device for feeding out a roll of photographic film strip, said holder being adapted to retain therewithin said roll and constituted of a body member and a cover member that are adapted to enter into mutual, light-tight engagement and are hingedly connected by a quickly disjointable hinge-means, said hinge means being adapted to constitute a light-trap adapted to accommodate the passage therethrough of said strip, said holder comprising: interiorly disposed annular shoulders adapted to engage and substantially completely support said roll marginally, adjacently both transversely opposed edges thereof, whereby the greater part of the outermost coil of said roll is retained out of contact with any parts of the holder; a compound discharge wall, from which said strip issues, constituted of an end wall of said body member and an end wall of said cover member; disposed angularly to said discharge wall, two compound side walls, each constituted of a substantially L-shaped wall-section that is part of said cover member and a substantially rectangular wall-section that is part of said body member; said rectangular wall-section being provided with a tongue that extends marginally therefrom and lies in a more inwardly disposed plane than that of the outer surface of said rectangular wall-section; said cover member being provided with an inner wall parallel with and adjacent to and spaced from said L-shaped wall-section, said inner wall and said L-shaped wall-section being adapted to snugly receive said tongue in a manner whereby outside light-rays, that would otherwise penetrate, are confronted by at least four directions of travel.

MILFORD HILQUIST.